United States Patent [19]

Riback

[11] Patent Number: 4,862,026
[45] Date of Patent: Aug. 29, 1989

[54] MOTOR UNIT BEARING

[76] Inventor: Richard Riback, 930 North Ave., Deerfield, Ill. 60015

[21] Appl. No.: 208,883

[22] Filed: Jun. 20, 1988

[51] Int. Cl.$^4$ .............................................. H02K 7/08
[52] U.S. Cl. ....................................... 310/90; 310/89; 310/157; 384/275
[58] Field of Search ................... 310/90, 89, 157, 258, 310/261; 384/275, 296, 297, 299, 300

[56] References Cited

U.S. PATENT DOCUMENTS

| 2,306,743 | 12/1942 | Morrill | 310/90 |
| 3,162,360 | 12/1964 | Privon | 310/90 |
| 3,420,335 | 1/1969 | Dochterman | 310/90 |
| 3,622,821 | 11/1971 | Maffey, Jr. | 310/90 |
| 4,499,661 | 2/1985 | Peachee, Jr. | 310/90 |
| 4,547,131 | 10/1985 | Riffe | 310/90 |

FOREIGN PATENT DOCUMENTS

| 908508 | 4/1954 | Fed. Rep. of Germany | 310/90 |
| 2435034 | 2/1975 | Fed. Rep. of Germany | 310/90 |
| 1613357 | 8/1978 | Fed. Rep. of Germany | 310/90 |

Primary Examiner—R. Skudy
Attorney, Agent, or Firm—Laff, Whitesel, Conte & Saret

[57] ABSTRACT

A motor having a stator and a rotor core rotatable therein and a rotor shaft secured for rotation with the rotor core comprising a motor housing, the stator supported by the motor housing, the rotor core having a counterbore extending partially along the axial length thereof and circumscribing a portion of the rotor shaft, the motor housing including a cylindrical unit bearing tower extending into the counterbore and surrounding the portion of the rotor shaft whereby the portion of the rotor shaft is free to rotate in a bore in the unit bearing tower.

7 Claims, 2 Drawing Sheets

MOTOR UNIT BEARING

The present invention relates generally to a unit bearing support for a motor and shaft, and more particularly to a novel construction of a bearing mount for a motor which extends into the rotor of the motor to support the rotor, and partially surrounds the shaft driven by the motor to provide additional support for the driven shaft.

BACKGROUND OF THE INVENTION

Motors having stators and rotors energized by the stators to rotate a rotor shaft are well known in the art. In a typical construction, the stator of the motor is supported by the housing, and the rotor core extends through the cylindrical inner extent of the stator for rotation relative to the stator when electrical energy is applied to the motor. A rotor shaft secured to the rotor core is rotated by the rotor core, and attached to a driven element for operation of the latter.

In present motor units, bearing elements are applied between the motor housing and the rotor shaft, usually at the points where the rotor shaft extends out of the stator and the rotor core. The bearing elements usually provide the only means of supporting the combined rotor core and rotor shaft, with no support internal of the stator-rotor core combination. If additional support for the rotor shaft is required, it is provided in the form of additional bearing elements positioned along the portion of the rotor shaft which extends out of and away from the rotor core. This necessitates motor housings requiring extra length to accommodate the additional bearing elements.

If additional bearings are not used because of a lack of space in the motor housing, the support elements for the drive shaft provide reduced strength, thereby decreasing the torque capability and efficiency of the motor. Also, heavier rotor shafts must be used to compensate for decreased bearing support.

Therefore, a primary object of the present invention is to provide a novel motor and motor housing construction which provides bearing support for the rotor shaft and rotor core which delivers added torque capability and increased efficiency of the motor.

Another object of the present invention is to provide a novel motor and motor housing construction which provides added bearing strength for the rotor shaft, thus allowing the use of a relatively smaller drive shaft for the motor.

A further object of the present invention is to provide a novel motor and motor housing construction which permits a relatively compact, shorter motor package.

Yet another object of the present invention is to provide a novel motor and motor housing construction which decreases the moment arm acting on the bearing system and on the rotor shaft, and reduces the moments along the length of the shaft.

Still another object of the present invention is to provide a novel motor and motor housing construction which permits the rotor shaft to rotate with less wobble by securing added alignment strength as a result of permitting use of a shorter rotor shaft.

SUMMARY OF THE INVENTION

These and other objects of the present invention are provided in a motor having a motor housing where the motor includes a stator and a rotor core rotatable in the stator, and a rotor shaft secured for rotation with the rotor core, and the motor housing includes indented step elements for supporting the stator in the housing. The rotor core has a counterbore extending partially along its axial length, which counterbore circumscribes a portion of the rotor shaft. Forming part of the motor housing is a cylindrical unit bearing tower which extends into the counterbore and surrounds a portion of the rotor shaft such that the rotor shaft rotates in a bore provided in the unit bearing tower.

One end of the unit bearing tower includes a radially extending surface which supports the rotating rotor core. If desired, a thrust bearing is inserted between the radially extending surface of the unit bearing tower and the rotor core to enhance the wearability and efficiency of the rotor core as it abuts the stationary unit bearing tower. The portion of the rotor shaft adjacent the counterbore of the rotor shaft extends through the bore of the unit bearing tower, and the inner surface of the bore provides a lateral bearing surface for that portion of the rotor shaft as the latter rotates.

In one embodiment of the present invention, a clearance is provided between the outside surface of the unit bearing tower and the inner surface of the counterbore in the rotor core, while the inner diameter of the unit bearing tower and the outer surface of the rotor shaft are in bearing contact with each other. In an alternate embodiment of the present invention, the outer surface of the unit bearing tower is in bearing contact with the inner surface of the counterbore of the rotor core, and a clearance is provided between the inner surface of the unit bearing tower and the outer surface of the rotor shaft. Both embodiments provide each of the objectives of the present invention enumerated above.

BRIEF DESCRIPTION OF THE DRAWING

These and other objects of the present invention will become apparent to one skilled in the art from the detailed description of the invention as illustrated in the accompanying drawing in which.

DESCRIPTION OF THE PREFERRED EMBODIMENT

Figure 1:
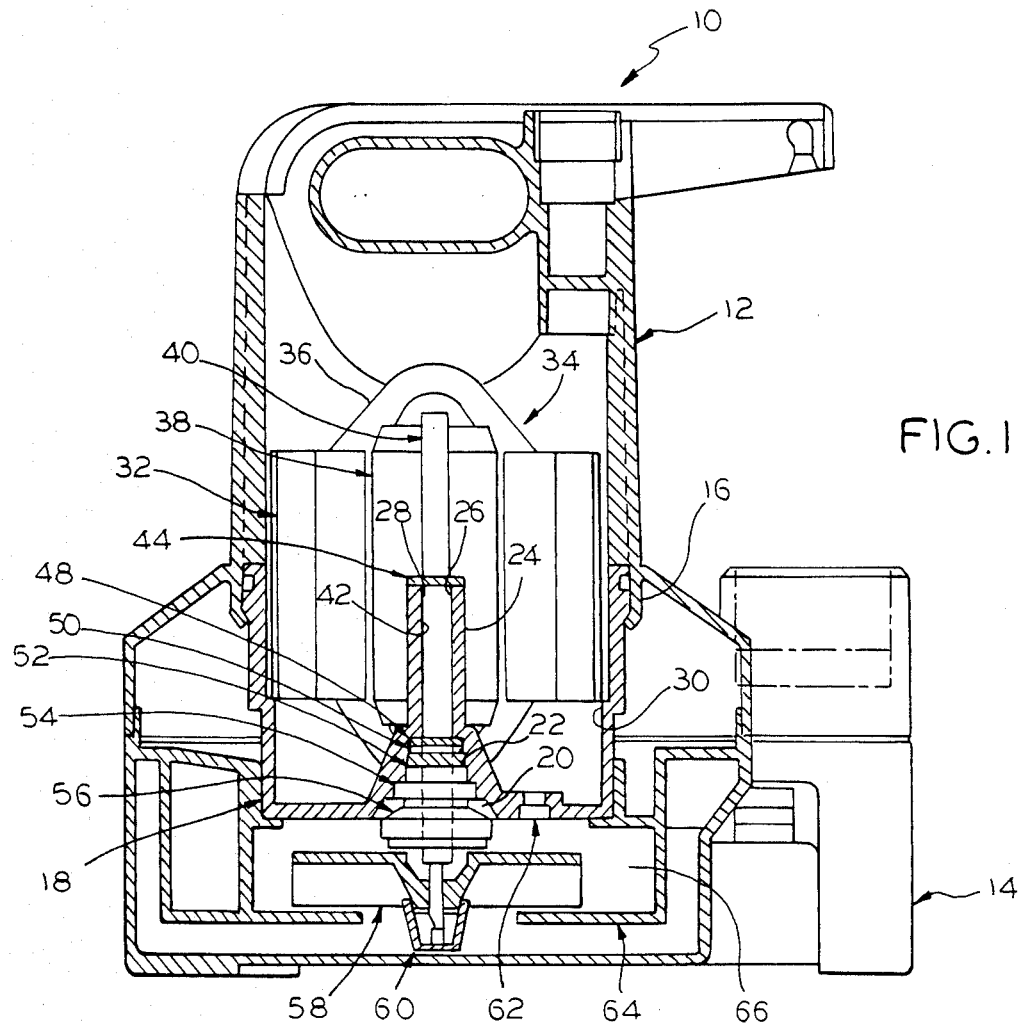
FIG. 1 is a cut-away sectional elevation view of a motor and motor housing constructed in accordance with the teachings of a preferred embodiment of the present invention, wherein the motor as shown drives a fluid pump mechanism.
Figure 2:
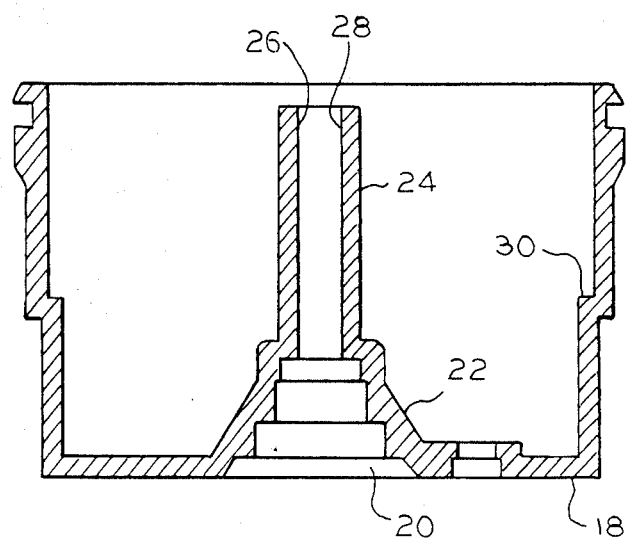
FIG. 2 is a sectional elevation view of the motor end frame of the motor and motor housing illustrated in FIG. 1, showing the details of the unit bearing tower forming part of the present invention.

Referring to FIG. 1, there is illustrated a motor driven fluid pump assembly generally designated by the numeral 10. In the description of the preferred embodiments, the motor and motor housing is shown in combination with a fluid pump apparatus for purpose of illustration. However, it is to be understood that the motor and motor housing described herein could be used in association with any other power driven apparatus. The pump 10 includes a motor housing 12 which includes a base 14 extending around the bottom of pump assembly 10. A circumferential portion 16 of the housing 12 extends internally into base 14, and a motor end frame 18 is rigidly attached to portion 16 of the housing. As seen in FIGS. 1 and 2, the bottom of motor end frame 18 has an aperture 20 therein, which is surrounded by a conical shaped extension 22 of motor end frame 18. A cylindrical unit bearing tower 24 is attached to and extends upward from conical extension 22, and unit bearing tower 24 includes a cylindrical bore 26 coaxial with the center line of aperture 20. The upper extremity of unit bearing tower 24 includes a radially extending surface 28 which supports a rotor core of a motor, as will be explained.

Motor end frame 18 includes a circumferentially indented or stepped portion 30 which supports stator element 32 of a motor unit generally designated by the numeral 34. Field wiring elements 36 are associated with stator 32, and when energized with electrical current, set up a field which causes energized rotor core 38 to rotate in the stator 32 in accordance with generally known electric motor principles. Attached to rotor core 38 is a rotor shaft 40 which, in the illustrated embodiment, extends through rotor core 38.

As seen in FIG. 1, a counterbore 42 extends into rotor core 38 partially along the axial length of the rotor core. Unit bearing tower 24 extends into counterbore 42 until radially extending surface 28 at the end of tower 24 abuts a corresponding radially extending surface of rotor core 38. In this manner, rotor core 38 is supported by unit bearing tower 24. If preferred, and as illustrated in FIG. 1, a thrust bearing or washer 44 may be inserted between radially extending surface 28 of tower 24 and the corresponding surface on rotor core 38 as an added bearing element.

In the embodiment of the present invention illustrated in FIG. 1, a clearance is provided between the surface of counterbore 42 of rotor core 38 and the outer surface of unit bearing tower 24. Thus, no bearing contact is provided between these two surfaces. However, the surface of cylindrical bore 26 inside of unit bearing tower 24 is in bearing contact with the length of rotor shaft 40 which extends through cylindrical bore 26. Thus, unit bearing tower 24 provides a bearing, and support, for rotor shaft 40 relative to motor housing 12 and motor end frame 18. This bearing reduces the lateral movement permitted rotor shaft 40.

Figure 3:
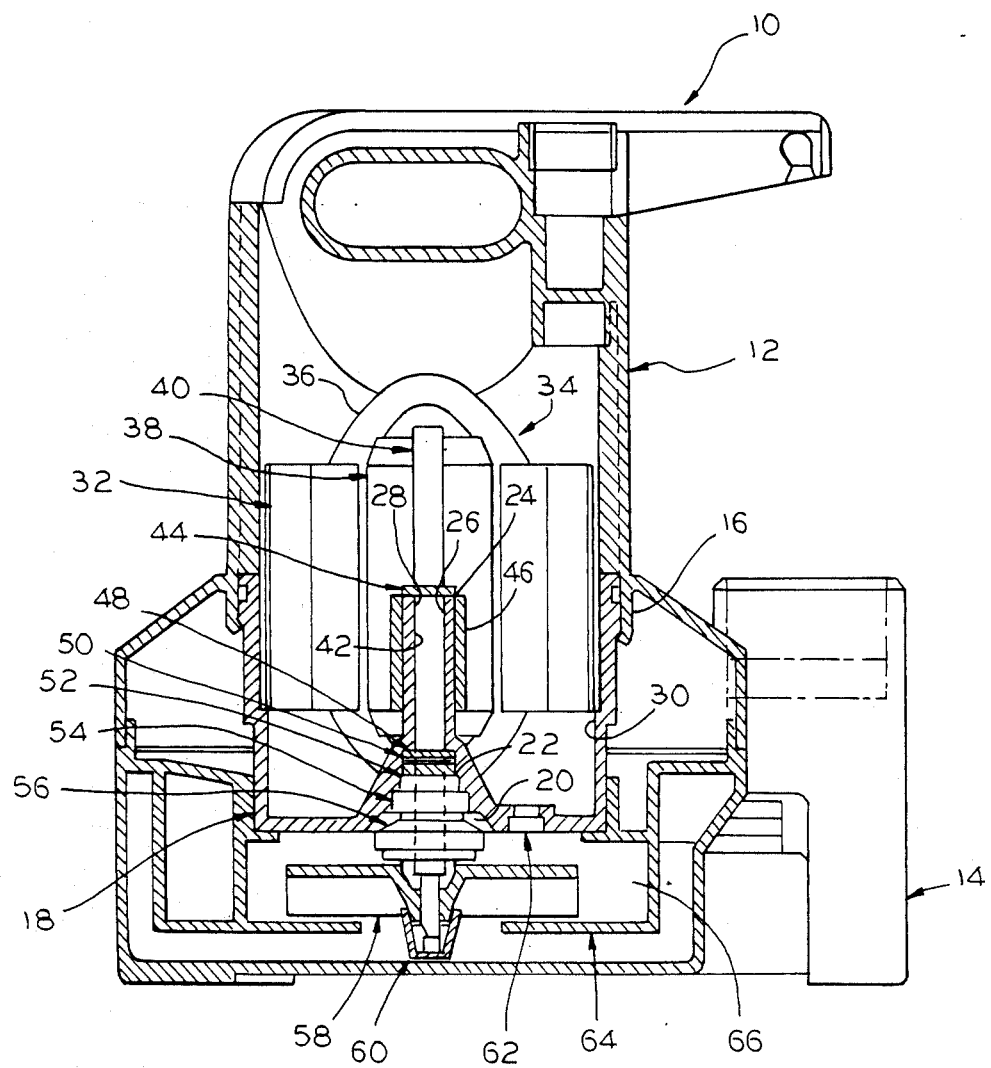
FIG. 3 is a cut-away sectional elevation view of another embodiment of the motor and motor housing of the present invention.

In an alternate embodiment of the present invention, as illustrated in FIG. 3 wherein like numerals are used to designate similar parts shown in FIGS. 1 and 2, counterbore 42 of rotor core 38 is lined with a bearing material 46 which includes a cylindrical inner surface which is in bearing contact with the outer cylindrical surface of unit bearing tower 24. As in the embodiment of FIG. 1, radially extending surface 28 of tower 24 contacts a corresponding radially extending surface of rotor core 38, which supports the rotor core on unit bearing tower 24. If desired, thrust bearing 44 is inserted between unit bearing tower 24 and rotor core 38.

In the embodiment of FIG. 3, a clearance is provided between the portion of rotor shaft 40 extending through unit bearing tower 24 and the surface of bore 26 in tower 24. Therefore, the shaft 40 is not in bearing contact with the inside of unit bearing tower 24. However, the inside surface of bearing material 46 is in bearing abutment or contact with the outer surface of unit bearing tower 24, thereby providing bearing support for rotor core 38 relative to motor housing 12 and motor end frame 18.

In the illustrative embodiments of FIGS. 1 and 3, which disclose my novel motor and unit bearing tower combination of elements in the environment of a fluid pump apparatus, a thrust washer 48 is attached to rotor shaft 40 in conical extension 22 of motor end frame 18. A snap ring 50 is provided to hold thrust bearing 48 in place. A plurality of seal elements 52, 54, 56 are provided on rotor shaft 40 to prevent fluid from the pump operation from entering aperture 20 and contacting motor unit 34. An impeller 58 is attached to the end of rotor shaft 40 by suitable means, and a cap element 60 fastens the impeller 58 to the rotor shaft.

An expansion plug 62 is provided in motor end frame 18. A suction plate 64 defines suction chamber 66 of pump assembly 10.

The above described unit bearing assembly embodiments provide a unique bearing construction between a rotor shaft or rotor core and the motor housing which encompasses the rotor core and shaft. The unit bearing tower 24 provides a bearing element which, by means of counterbore 42, extends into the rotor core and embraces or surrounds the rotor shaft at a point prior to the emergence of the rotor shaft from the rotor core. This construction allows the motor and housing unit to be relatively more compact, resulting in a shorter motor package.

Additionally, the unit bearing tower 24 in the embodiment of FIG. 1 provides an elongated bearing surface which embraces rotor shaft 40 over a relatively longer length of the shaft, providing added support for the shaft and decreasing the shaft's tendency and ability to wobble. Also, since the disclosed construction enables the use of a shorter rotor shaft 40, there is an additional reduction in the tendency of the shaft to wobble. Alignment of the shorter shaft 40 is also easier using the disclosed construction.

The counterbore 42 also provides a decreased moment arm acting on the bearing system for rotor shaft 40. This reduces the moments acting along the length of shaft 40, and allows use of a smaller diameter, less rigid rotor shaft 40, providing added cost savings in manufacturing units such as pump assembly 10.

In addition, unit bearing tower 24 adds strength to the housing structure holding rotor shaft 40, allowing increased torque and greater efficiency delivered to the elements driven by rotor shaft 40.

Those who are skilled in the art will readily perceive how to modify the presently disclosed invention while still keeping within the teachings of the invention. Therefore, the appended claims are to be construed to cover all equivalent structures which fall within the scope and spirit of the present invention.

I claim:

1. A motor having a stator and a rotor core rotatable therein, and a rotor shaft secured for rotation with said rotor core, comprising:
    a motor housing;
    said stator supported by said motor housing;
    said rotor core having a counterbore extending partially along the axial length thereof and circumscribing a portion of said rotor shaft;
    said motor housing including a cylindrical unit bearing tower extending into said counterbore and surrounding said portion of said rotor shaft whereby said portion of said rotor shaft is free to rotate in a bore in said unit bearing tower;
    said unit bearing tower including a radially extending surface at one end thereof which supports said rotor core.

2. A motor having a stator and a rotor core rotatable therein, and a rotor shaft secured for rotation with said rotor core, comprising:
   a motor housing;
   said stator supported by said motor housing;
   said rotor core having a counterbore extending partially along the axial length thereof and circumscribing a portion of said rotor shaft;
   said motor housing including a cylindrical unit bearing tower extending into said counterbore and surrounding said portion of said rotor shaft whereby said portion of said rotor shaft is free to rotate in a bore in said unit bearing tower;
   said unit bearing tower including a radially extending surface at one end thereof which supports said rotor core; and
   a thrust bearing disposed between said radially extending surface of said unit bearing tower and said rotor core.

3. The motor of claim 1 wherein said bore of said cylindrical unit bearing tower has an inner surface forming a part thereof, said portion of said rotor shaft extending along said inner surface, said inner surface providing a lateral bearing surface for said portion of said rotor shaft as said rotor shaft rotates.

4. The motor of claim 1 wherein said motor housing includes inwardly directed step means, said stator supported by said step means of said motor housing, said rotor core being rotatable inside said stator.

5. The motor of claim 1 including a clearance between an outer surface of said unit bearing tower and said rotor core whereby said rotor core rotates freely about said unit bearing tower.

6. The motor of claim 1 wherein said unit bearing tower has an inner surface which frictionally engages said portion of said rotor shaft and provides a bearing surface for said portion of said rotor shaft.

7. A motor having a stator and a rotor core rotatable therein, and a rotor shaft secured for rotation with said rotor core, comprising:
   a motor housing;
   said stator supported by said motor housing;
   said rotor core having a counterbore extending partially along the axial length thereof and circumscribing a portion of said rotor shaft;
   said motor housing including a cylindrical unit bearing tower extending into said counterbore and surrounding said portion of said rotor shaft whereby said portion of said rotor shaft is free to rotate in a bore in said unit bearing tower;
   wherein a portion of an inner surface of said counterbore in said rotor core is in frictional contact with an outer surface of said unit bearing tower whereby said unit bearing tower provides a bearing surface for said counterbore of said rotor core.

* * * * *